(12) United States Patent
Ichikawa et al.

(10) Patent No.: US 7,435,182 B2
(45) Date of Patent: Oct. 14, 2008

(54) DRIVE SHAFT

(75) Inventors: Kazuyuki Ichikawa, Okazaki (JP); Yuji Inagaki, Anjo (JP); Koji Nishi, Anjo (JP)

(73) Assignee: JTEKT Corporation, Osaka (JP)

( * ) Notice: Subject to any disclaimer, the term of this patent is extended or adjusted under 35 U.S.C. 154(b) by 116 days.

(21) Appl. No.: 11/137,578

(22) Filed: May 26, 2005

(65) Prior Publication Data

US 2005/0277479 A1  Dec. 15, 2005

(30) Foreign Application Priority Data

Jun. 14, 2004  (JP) .............................. 2004-176115

(51) Int. Cl.
*F16C 3/00* (2006.01)

(52) U.S. Cl. ...................................... 464/179; 464/145

(58) Field of Classification Search ................. 464/179, 464/117, 118, 111, 145, 146, 904–906
See application file for complete search history.

(56) References Cited

U.S. PATENT DOCUMENTS

| 4,904,227 | A | 2/1990 | Sasaki et al. |
| 4,995,850 | A * | 2/1991 | van der Drift et al. ....... 464/906 |
| 5,632,683 | A | 5/1997 | Fukumura et al. |
| 6,319,337 | B1 | 11/2001 | Yoshida et al. |
| 6,390,928 | B1 | 5/2002 | Welschof et al. |

FOREIGN PATENT DOCUMENTS

| JP | 01-303319 | * 12/1989 |
| JP | 01303319 A | * 12/1989 |

* cited by examiner

*Primary Examiner*—Aaron M Dunwoody
(74) *Attorney, Agent, or Firm*—Oblon, Spivak, McClelland, Maier & Neustadt, P.C.

(57) ABSTRACT

A drive shaft is configured from a shaft body, a shaft portion provided with extensions and boot mounting parts coaxially and integrally formed on ends thereof, and constant velocity joints attached to ends of the extensions via interior members. The outer diameter of intermediate portions of the extensions is smaller than that of the ends and the boot mounting parts. Formed on the opening-sides of the inner surfaces of the exterior members of the constant velocity joints are flanks that face outward and leave a slight clearance with the intermediate portions. Edges forming the boot mounting part sides of the intermediate portions are set to positions corresponding to outer edges of the flanks, and tapered portions connect the edges and the boot mounting parts.

4 Claims, 5 Drawing Sheets

DRIVE SHAFT

INCORPORATION BY REFERENCE

The disclosure of Japanese Patent Application No. 2004-176115 filed on Jun. 14, 2004 including the specification, drawings and abstract is incorporated herein by reference in its entirety.

BACKGROUND OF THE INVENTION

1. Field of the Invention

The present invention relates to a drive shaft used in an automotive drive train or the like, and more particularly, relates to a drive shaft comprising a shaft and a constant velocity joint.

2. Description of the Related Art

A power transmission device for automobiles or the like normally transmits a driving force through a drive shaft comprising a shaft portion and a constant velocity joint. The shaft portion undergoes induction heat treatment or the like to increase its strength, which results in the formation of a hardened layer up to a certain depth from the surface while leaving a non-hardened portion at the shaft core. Both ends thereof are in splined engagement with interior members of the constant velocity joint (for an example, refer to Japanese Patent Laid-Open Publication No. 2000-240669, paragraphs 2 to 10 and FIG. 1). FIG. 3 shows an example of such a drive train, wherein a shaft portion 1 has boot mounting parts 3, 5 and extensions 4, 6 respectively connected and coaxially formed with both ends of a shaft body 2.

The inboard-side extension 4 of the shaft portion 1, for example, is connected to a driving-side member of a side gear or the like in a differential, via a tripod-type sliding constant velocity joint 30. Meanwhile, the outboard-side extension 6, for example, is connected to a driven-side member of a hub or the like in a driven wheel, via a ball-type fixed constant velocity joint 35. Boots 33, 38 made from soft rubber, resin or the like are provided in order to seal the interiors of the constant velocity joints 30, 35 against dirt, water and so forth from outside. More specifically, the boots 33, 38 are respectively provided between the constant velocity joints 30, 35 and the boot mounting parts 3, 5 on both ends of the shaft body 2 of the shaft portion 1. One end of each of the boots 33, 38 overlay an opening on each of exterior members 31, 36 of the constant velocity joints 30, 35, and is attached using bands 34a, 39a so as to form an airtight seal. Another end is attached via the boot mounting parts 3,5 using bands 34b, 39b so as to form an airtight seal as well. In order to fixedly mount the boots 33, 38 and ensure sealing, boot grooves 3a, 5a are formed on the boot mounting parts 3, 5.

As shown in FIG. 4, the inboard-side extension 4 comprises a cylindrical intermediate portion 4a, as well as an end 4b in spline engagement with an interior member 32a of the constant velocity joint 30. The intermediate portion 4a has an outer diameter smaller than the boot mounting part 3 and the end 4b. Both ends of the intermediate portion 4a are connected to the boot mounting part 3 and the end 4b by tapered portions 4c, 4d. The value for the outer diameter of the intermediate portion 4a of the extension 4 is the minimum necessary for obtaining a required transmitted torque. Formed on an opening-side of the inner surface of the exterior member 31 of the constant velocity joint 30 is a flank 31a that faces outward and leaves a slight clearance with the intermediate portion 4a. The flank 31a is formed in order to avoid interference with the intermediate portion 4a of the extension 4 at a maximum shaft intersection angle between the extension 4 and the exterior member 31.

Likewise, as shown in FIG. 5, the outboard-side extension 6 comprises a cylindrical intermediate portion 6a, as well as an end 6b in spline engagement with an interior member 37 of the constant velocity joint 35. The intermediate portion 6a has a diameter smaller than the boot mounting part 5 and the end 6b. Both ends of the intermediate portion 6a are connected to the boot mounting part 5 and the end 6b by tapered portions 6c, 6d. Similar to the extension 4, the value for the outer diameter of the intermediate portion 6a of the extension 6 is the minimum necessary in terms of strength. Formed on an opening-side of the inner surface of the exterior member 36 of the constant velocity joint 35 is a flank 36a that faces outward, and also leaves a slight clearance with the intermediate portion 6a at a maximum shaft intersection angle.

For both the extension 4 and the extension 6, the position of a boundary between the intermediate portions 4a, 6a and the base side of tapered portions 4c, 6c at the maximum shaft intersection angle is set somewhat apart from outer edges 31b, 36b of the flanks 31a, 36a of the constant velocity joints 30, 35 and set towards the boot mounting parts 3, 5 sides.

As mentioned above, a hardened layer is formed up to a certain depth from the surface while leaving a non-hardened portion at the shaft core to increase the strength of the shaft in the drive shaft. In order to obtain a maximum overall increase in strength, the depth of heat treatment, t/R (where, t: depth of hardened layer, and R: radius of heat treated member), must be set to a certain optimum value. For example, alloy steel used in the shaft differs depending on the material, but the optimum heat treatment depth t/R is within the range of 0.55 to 0.8. In other words, the static torsional strength improves as the heat treatment depth t/R increases; although the fatigue torsional strength falls once the heat treatment depth t/R exceeds a certain limit. Therefore, the heat treatment depth t/R must be set to a value smaller than 0.8. The outer diameters of the intermediate portions 4a, 6a of the extensions 4, 6 are set to the minimum values necessary for obtaining the required transmitted torque. Meanwhile, the boot grooves 3a, 5a are formed on the boot mounting parts 3, 5 to attach the boots 33, 38, and making the outer diameter of the bottom portion of the boot grooves 3a, 5a smaller than the outer diameter of the intermediate portions 4a, 6a would adversely affect strength. Consequently, the outer diameters of the boot mounting parts 3, 5 forming both sides of the boot grooves 3a, 5a are larger than the outer diameters of the intermediate portions 4a, 6a, which results in an outer diameter of the shaft portion 1 that varies among the intermediate portions 4a, 6a and the boot mounting parts 3, 5. Moreover, splines formed on the ends 4b, 6b necessitate an outer diameter larger than that of the intermediate portions 4a, 6a for the sake of ensuring strength, which also means the outer diameter of the shaft portion 1 varies among the intermediate portions 4a, 6a and the ends 4b, 6b as well.

SUMMARY OF THE INVENTION

An induction heat treatment device is used to harden this type of shaft, and adjustment of the heat treatment depth t/R is performed by adjusting the magnitude of high frequency output, coil shape and frequency. As explained earlier, variations in the outer diameter of the shaft portion 1 among the intermediate portions 4a, 6a and the boot mounting parts 3, 5 also vary the heat capacity per unit length, thus making it difficult to control the heat treatment depth t/R in the surrounding vicinity. This is due to sudden changes in the outer diameter at the tapered portions 4c, 4d, despite performing induction hardening on the shaft aiming for the optimum value. Consequently, the heat treatment depth t/R misses the target value, thereby lowering the strength in this vicinity. Sudden changes in the outer diameter at the tapered portions 4c, 4d and surrounding vicinity thereof also concentrate the magnetic field during induction hardening, resulting in an uneven temperature and a hardened depth that exceeds or falls short of the target value. For this reason, attempts to conform the heat treatment depth t/R to the optimum value at a certain position in the vicinity of the boot mounting parts 3, 5 leads to the heat treatment depth t/R around that position exceeding or falling short of the optimum value. Thus a problem arises in which sufficient local strength has not been secured for some parts. It is an object of the present invention to resolve such a problem.

In order to achieve the above object, the drive shaft according to the present invention has a shaft body; a shaft portion provided with a boot mounting part coaxially formed on an end thereof, a coaxially formed extension subsequent to the boot mounting part; and a constant velocity joint attached to an end of the extension via an interior member. The extension has an intermediate portion with a cylindrical shape and an outer diameter smaller than that of the boot mounting part and the end of the extension. The constant velocity joint has an interior sealed from the outside by an end of a boot that is attached to the boot mounting part so as to form an airtight seal. The constant velocity joint is provided on an opening-side of an inner surface of an exterior member thereof with a flank that faces outward and leaves a slight clearance with the intermediate portion at a maximum shaft intersection angle between the extension and the exterior member. The intermediate portion has a first edge on the boot mounting part side that is positioned closer to the boot mounting part side than a position corresponding to an outer edge of the flank at the maximum shaft intersection angle or a position in a vicinity thereof. Lastly, the boot mounting part is connected to the first edge by a tapered portion of the shaft body.

According to a first aspect of the present invention as described above, the intermediate portion has a first edge on the boot mounting part side that is positioned closer to the boot mounting part side than a position corresponding to an outer edge of the flank at the maximum shaft intersection angle or a position in a vicinity thereof, and the boot mounting part is connected to the first edge by a tapered portion of the shaft body. In this state, the tapered portion is set to a maximum length. This in turn moderates variations in the outer diameter of the shaft portion between the intermediate portion and the boot mounting part, whereby variations in the heat capacity per unit length therebetween are moderated as well. Consequently, controlling the heat treatment depth t/R therebetween becomes easier, making it possible to obtain a heat treatment depth t/R at or near an optimum value in the range of the boot mounting part and the intermediate portion in the extension of the drive shaft. Reductions in local strength resulting from the shape-changing rate of the shaft portion can also be greatly improved.

It is preferable in the drive shaft according to a second aspect of the present invention for the intermediate portion to have a second edge on the end side that is positioned closer to the end side than a position corresponding to an inner edge of the flank at the maximum shaft intersection angle or a position in a vicinity thereof. It is also preferable for the end of the extension to be connected to the second edge by a tapered portion on the end side of the shaft body.

Furthermore, according to the second aspect of the present invention, the intermediate portion has a second edge on the end side that is positioned closer to the end side than a position corresponding to an inner edge of the flank at the maximum shaft intersection angle or a position in a vicinity thereof; and the end of the extension is connected to the second edge by a tapered portion on the end side of the shaft body. Therefore, variations in the outer diameter of the drive shaft between the intermediate portion and the end are moderated, whereby variations in the heat capacity per unit length therebetween are moderated as well. Consequently, it is possible to obtain a heat treatment depth t/R at or near an optimum value in the range between the end and the intermediate portion in the extension of the drive shaft. Reductions in local strength resulting from the shape-changing rate of the shaft portion can also be further improved.

DETAILED DESCRIPTION OF THE PREFERRED EMBODIMENTS

Figure 1:
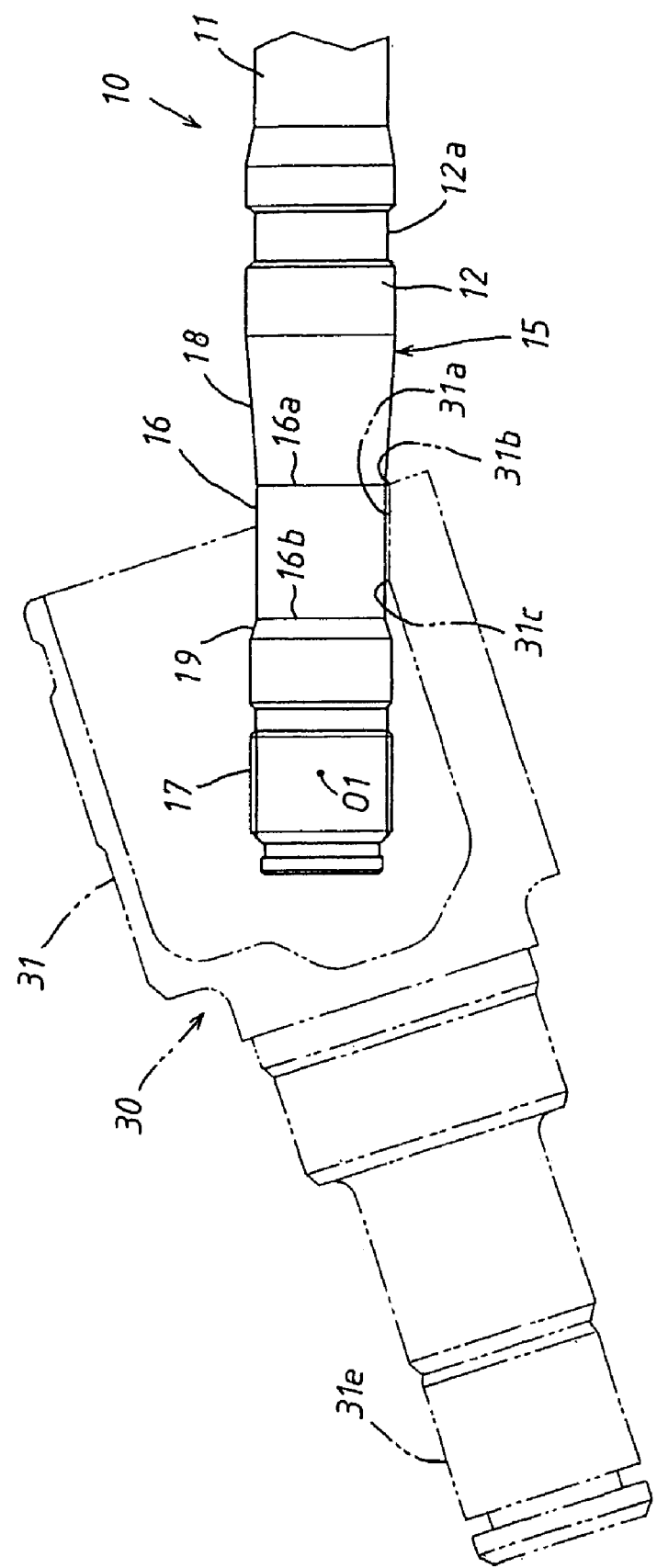
FIG. 1 is a partial enlarged view illustrating an inboard-side extension and a vicinity thereof in an embodiment of a drive shaft according to the present invention.

Hereinafter, a preferred embodiment of a drive shaft according to the present invention will be described based upon an embodiment shown in FIGS. 1 and 2. This embodiment applies the present invention to a power transmission device connecting a differential and a drive wheel of an automobile. The power transmission device is similar in practice to related art shown in FIG. 3, except for the shape of an extension on both ends of the drive shaft.

A shaft portion 10 in the embodiment comprises a shaft body 11 formed from alloy steel; boot mounting parts 12, 13 coaxially and integrally formed on ends thereof; and extensions 15, 20 coaxially and integrally formed subsequent to the boot mounting parts. Similar to the related art shown in FIG. 3, a tripod-type sliding constant velocity joint 30 is connected to an end 17 of an inboard-side extension (extension) 15, whereas a ball-type fixed constant velocity joint 35 is connected to an end 22 of an outboard-side extension (extension) 20. Respective ends of boots 33, 38 also similar to that in the related art shown in FIG. 3 overlay an opening in each of exterior members 31, 36 of the constant velocity joints 30, 35, and are attached using bands 34a, 39a so as to form an airtight seal. Other ends are attached to form an airtight seal using bands 34b, 39b via the boot mounting parts 12, 13 on which boot grooves 12a, 13a are formed.

FIG. 1 is an enlarged view including the inboard-side extension 15 of the shaft portion 10 according to the embodiment. An intermediate portion 16 of the inboard-side extension 15 has a cylindrical shape with a fixed diameter. Based upon the same reason explained in the related art, the major diameter is smaller than the outer diameter of the boot mounting part 12 and the end 17. An edge 16a (that corresponds to a first edge in the claims) of the intermediate portion 16 is connected to the boot mounting part 12 by a tapered portion 18, whereas an edge 16b (that corresponds to a second edge in the claims) is connected to the end 17 by a tapered portion 19 on the end side. The outer diameter of the shaft body 11 is smaller than the outer diameter of the boot mounting part 12, and larger than the diameter of the intermediate portion 16.

Figure 3:
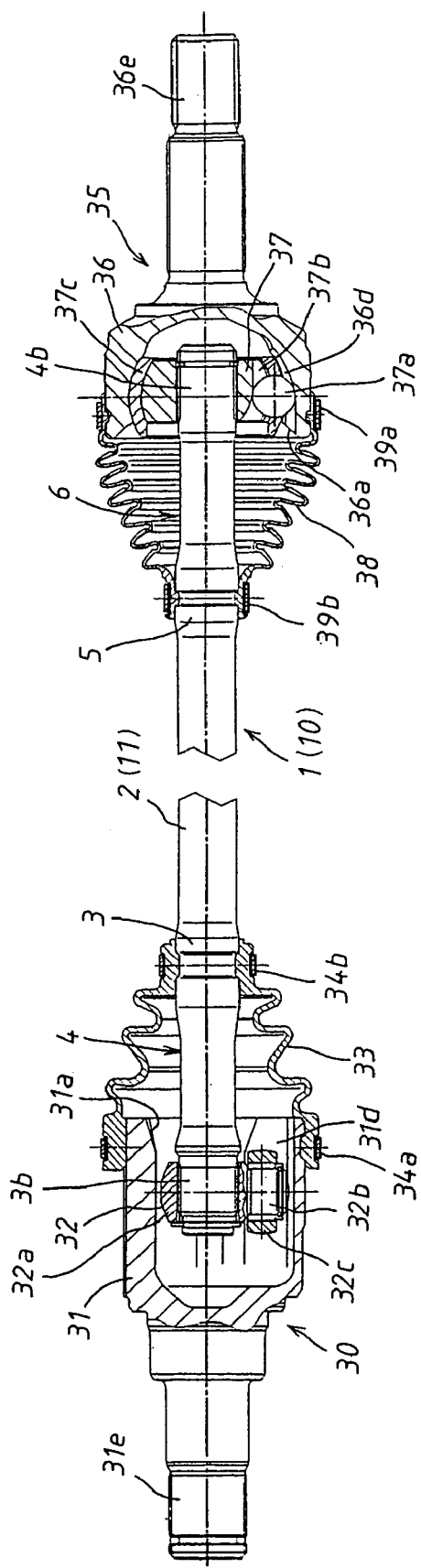
FIG. 3 is a vertical cross-sectional view illustrating an example of a power transmission device for an automobile including a drive shaft identical to the present invention.

As mainly shown in FIG. 3, the tripod-type constant velocity joint 30 comprises an exterior member 31, a tripod 32, and three rollers 32c. On an inner surface of the exterior member 31, three axial guiding grooves 31d are formed at regular intervals in the circumferential direction. The tripod 32 is formed with three trunnions 32b projecting from an interior member 32a at regular intervals in the circumferential direction. The rollers 32c are rotatably supported by each trunnion 32b, in addition to being guided and supported within the guiding grooves 31d of the exterior member 31. In spline engagement are the interior member 32a of the constant velocity joint 30 and the end 17 of the inboard-side extension 15. Also in coaxial spline engagement are a shaft 31e coaxially projecting from the exterior member 31 in the axis direction and a side gear (not shown) of a differential. The inboard-side extension 15 in which the end 17 is in spline engagement with the interior member 32a is capable of freely swiveling around a center point O1 of the interior member 32a. Moreover, the center point O1 is movable in the center axis direction of the exterior member 31.

As shown in FIGS. 1 and 3, a flank 31a is formed on an opening side of the inner surface on the exterior member 31 of the tripod-type constant velocity joint 30. The flank 31a comprises a portion of a conical surface extending outward at a position in the circumferential direction between the guiding grooves 31d. As shown in FIG. 1, the flank 31a is formed such that a slight clearance is created with the intermediate portion 16 of the inboard-side extension 15 at the maximum shaft intersection angle of the exterior member 31 and the inboard-side extension 15, with the center point O1 at the farthest inward position with respect to the exterior member 31. In addition, the edge 16a on the boot mounting part 12 side of the intermediate portion 16 of the inboard-side extension 15 is at a position corresponding to an outer edge 31b of the flank 31a on the exterior member 31 at the maximum shaft intersection angle. Meanwhile, another edge 16b on the end 17 side of the intermediate portion 16 is positioned closer to the end 17 side than a position corresponding to an inner edge 31c of the flank 31a on the exterior member 31.

Figure 2:
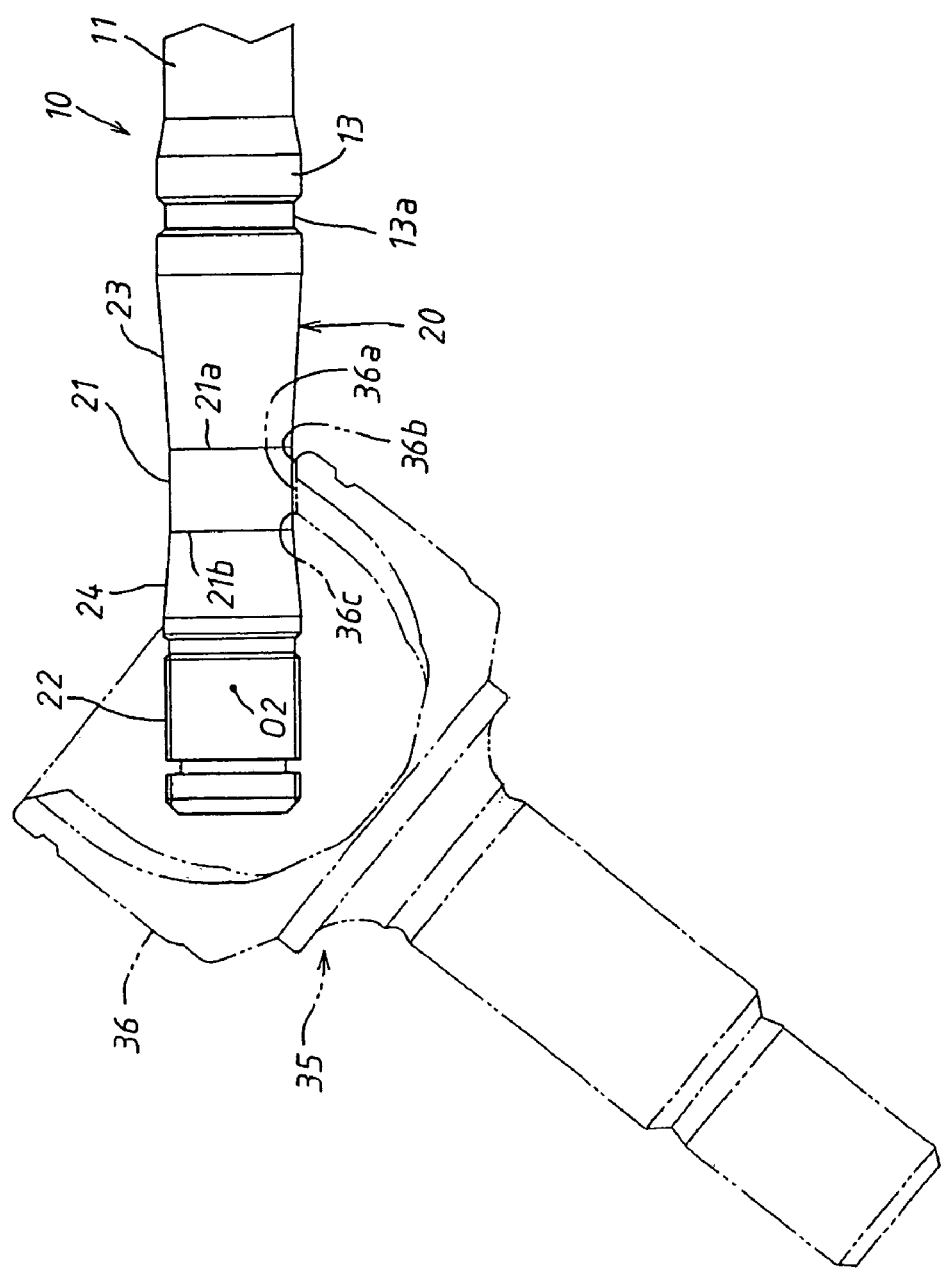
FIG. 2 is a partial enlarged view illustrating an outboard-side extension and a vicinity thereof in the embodiment shown in FIG. 1.

FIG. 2 shows an enlarged view including the outboard-side extension 20 of the shaft portion 10 according to the embodiment. Similar to the inboard-side extension 15, an intermediate portion 21 of the outboard-side extension 20 also has a cylindrical shape. The major diameter thereof is smaller than the outer diameter of the boot mounting part 13 and an end 22. An edge 21a of the intermediate portion 21 is connected to the boot mounting part 13 by a tapered portion 23, whereas another edge 21b is connected to the end 22 by a tapered portion 24 on the end side. The intermediate portion 21 has a diameter substantially identical to that of the intermediate portion 16 of the inboard-side extension 15, and which is smaller than that of the shaft body 11.

As mainly shown in FIG. 3, the ball-type constant velocity joint 35 comprises an exterior member 36 and an interior member 37, in addition to six balls 37a. On the exterior member 36 and the interior member 37, six ball grooves 36d, 37b are respectively formed at regular intervals in the circumferential direction. The balls 37a roll within the ball grooves 36d, 37b. In spline engagement are the interior member 37 of the constant velocity joint 35 and the end 22 of the outboard-side extension 20. Also in spline engagement are a shaft 36e coaxially projecting from the exterior member 36 in the axis direction and a hub of a drive wheel. The outboard-side extension 20 in which the end 22 is in spline engagement with the interior member 37 is capable of freely swiveling around a center point O2 of the interior member 37.

As shown in FIGS. 2 and 3, a conical flank 36a extending outward is formed on an opening side of the inner surface on the exterior member 36 of the ball-type constant velocity joint 35. As shown in FIG. 2, the flank 36a is formed such that a slight clearance is created with the intermediate portion 21 of the outboard-side extension 20 at the maximum shaft intersection angle of the exterior member 36 and the outboard-side extension 20. In addition, at the maximum shaft intersection angle, the edge 21a on the boot mounting part 13 side of the intermediate portion 21 of the outboard-side extension 20 is in the vicinity of a position corresponding to an outer edge 36b of the flank 36a on the exterior member 36, but positioned closer to the boot mounting part 13 side to a certain extent. Meanwhile, another edge 21b on the end 22 side of the intermediate portion 21 is in the vicinity of a position corresponding to an inner edge 36c of the flank 36a on the exterior member 36, but positioned closer to the end 22 side to a certain extent.

In the shaft portion 10, the boot mounting parts 12, 13 and the extensions 15, 20 are coaxially formed integral with both ends of the shaft body 11. To obtain a maximum overall increase in strength, induction heat treatment is performed on the shaft portion 10 with a target value set such that a heat treatment depth t/R reaches an optimum value (0.55 to 0.8, although it may vary for alloy steel depending on the material). In the inboard-side extension 15, the edge 16a on the boot mounting part 12 side of the intermediate portion 16 is positioned corresponding to the outer edge 31b of the flank 31a at the maximum shaft intersection angle, with the center point O1 at the farthest position inward with respect to the exterior member 31. In this state, the length of the tapered portion 18 connecting the edge 16a and the boot mounting part 12 is set to a maximum length. This in turn moderates variations in the outer diameter of the shaft portion 10 between the intermediate portion 16 and the boot mounting part 12, whereby variations in the heat capacity per unit length therebetween are moderated as well. Accordingly, fluctuations in the heat treatment depth t/R therebetween are also reduced. Consequently, it is possible to obtain a heat treatment depth t/R at or near the target value in the range between the boot mounting part 12 and the intermediate portion 16 in the extension 15 of the shaft portion 10. Compared to related art such as that shown in FIG. 4, the possibility of a decrease in local strength is greatly reduced. Moreover, there is an increase in strength corresponding to the increase in the length of the tapered portion compared to a conventional length, because the intermediate portion with its small diameter is shortened.

Figure 5:
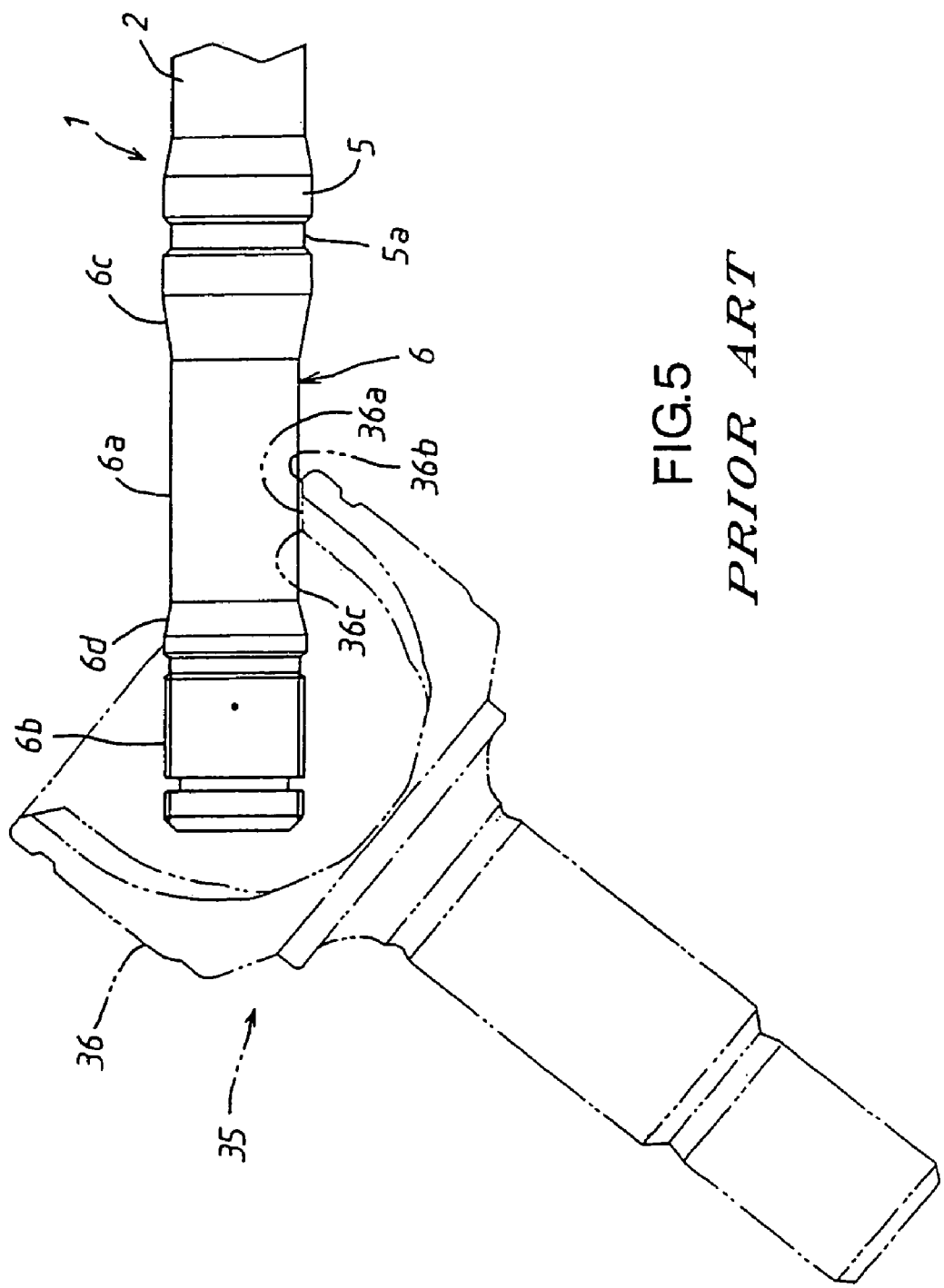
FIG. 5 is a partial enlarged view identical to FIG. 2 that illustrates an example of a drive shaft according to related art.

In the outboard-side extension 20 as well, the edge 21a on the boot mounting part 13 side of the intermediate portion 21 is positioned closer to the boot mounting part 13 side than the vicinity of a position corresponding to the outer edge 36b of the flank 36a at the maximum shaft intersection angle. The edge 21a and the boot mounting part 13 are connected by the tapered portion 23. Therefore, similar to the inboard-side extension 15, variations in the outer diameter of the shaft portion 10 between the intermediate portion 21 and the boot mounting part 13 are moderated, thereby moderating variations in the heat capacity per unit length therebetween as well. In addition, concentration of the magnetic field during induction hardening is also suppressed. Consequently, controlling the heat treatment depth t/R therebetween becomes easier, making it possible to obtain a heat treatment depth t/R at or near the target value in the range of the boot mounting parts 12, 13 and the intermediate portions 16, 21 in the extensions 15, 21 of the shaft portion 10. Reductions in local strength can also be greatly improved compared to related art as shown in FIG. 5.

Another edge 21b on the end 22 side of the intermediate portion 21 in the outboard-side extension 20 is positioned closer to the end 22 side than the vicinity of a position corresponding to the inner edge 36c of the flank 36a at the maximum shaft intersection angle. The other edge 21b and the end 22 are connected by the tapered portion 24 on the end side. Therefore, variations in the outer diameter of the shaft portion 10 between the intermediate portion 21 and the end 22 are moderated, whereby variations in the heat capacity per unit length therebetween are moderated as well. Consequently, controlling the heat treatment depth t/R therebetween becomes easier, making it possible to further improve reductions in local strength compared to related art as shown in FIG. 5, similar to the tapered portion 23 and boot mounting part 13 side. Moreover, there is an increase in strength corresponding to the increase in the length of the tapered portion compared to the conventional length, because the intermediate portion with a small diameter is shortened.

Figure 4:
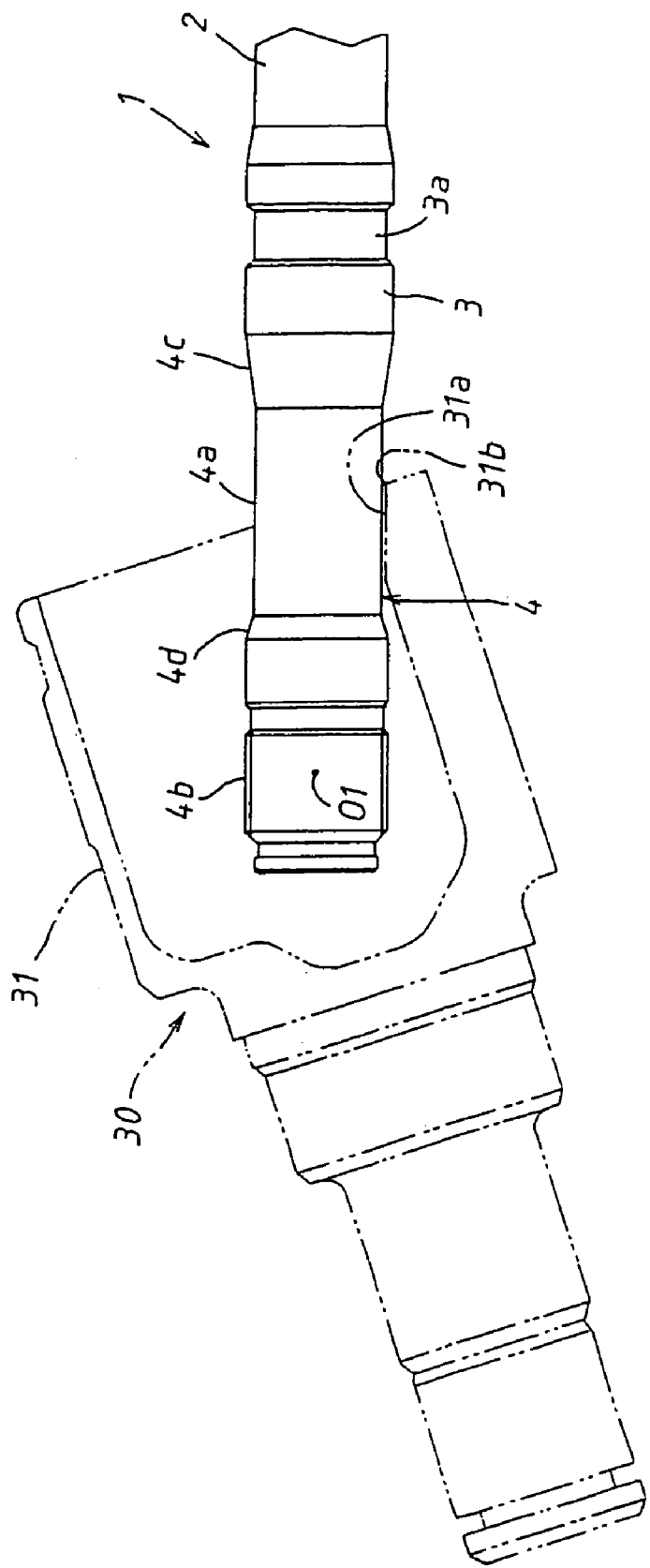
FIG. 4 is a partial enlarged view identical to FIG. 1 that illustrates an example of a drive shaft according to related art.

Shown below are the results for static torsional strength after induction heat treatment for a drive shaft with the shape of related art shown in FIGS. 4 and 5 (Test 1), and a drive shaft with the shape of the present invention shown in FIGS. 1 and 2 (Test 2). The values shown use Test 1 as a reference (1.0).

|  | Test 1 | Test 2 |
|---|---|---|
| Static torsional strength (average) | 1.00 | 1.11 |

(Using Test 1 as a reference set to 1.0)

What is claimed is:

1. A drive shaft comprising:
a shaft body;
a shaft portion provided with a boot mounting part coaxially formed on an end thereof, a coaxially formed extension subsequent to the boot mounting part; and
a constant velocity joint attached to an end of the extension via an interior member,
wherein the extension has an intermediate portion with a cylindrical shape and an outer diameter smaller than that of the boot mounting part and the end of the extension,
the constant velocity joint has an interior sealed from the outside by an end of a boot that is attached to the boot mounting part so as to form an airtight seal,
the constant velocity joint is provided on an opening-side of an inner surface of an exterior member thereof with a flank that faces outward and leaves a slight clearance with the intermediate portion at a maximum shaft intersection angle between the extension and the exterior member,
the intermediate portion has a first edge toward the boot mounting part and a second edge toward the end of the extension, wherein the first edge is positioned in the vicinity of an outer edge of the flank at the maximum shaft intersection angle and closer to the boot mounting part than is the outer edge of the flank at the maximum shaft intersection angle, and wherein the outer edge of the flank at the maximum shaft intersection angle is located closer to said first edge than to said second edge at the maximum shaft intersection angle, and
the boot mounting part is connected to the first edge by a tapered portion of the shaft body.

2. The drive shaft according to claim 1, wherein
the second edge is positioned closer to the end of the extension than a position corresponding to an inner edge of the flank at the maximum shaft intersection angle or a position in a vicinity thereof; and
the end of the extension is connected to the second edge by a tapered portion on the end of the shaft body.

3. A drive shaft comprising:
a shaft body;
a shaft portion of the shaft body provided with a boot mounting part coaxially formed on an end thereof, a coaxially formed extension subsequent to the boot mounting part, the shaft body terminating at a splined end of the extension; and
a constant velocity joint attached to the splined end of the extension via an interior member,
wherein the extension has an intermediate portion with a cylindrical shape and an outer diameter smaller than that of the boot mounting part and the splined end of the extension,
the constant velocity joint has an interior sealed from the outside by an end of a boot that is attached to the boot mounting part so as to form an airtight seal,
the constant velocity joint is provided on an opening-side of an inner surface of an exterior member thereof with a flank that faces outward and leaves a clearance with the intermediate portion at a maximum shaft intersection angle between the extension and the exterior member,
the intermediate portion has a first edge toward the boot mounting part and a second edge toward the end of the extension, wherein the first edge is positioned in the vicinity of an outer edge of the flank at the maximum shaft intersection angle and closer to the boot mounting part than is the outer edge of the flank at the maximum shaft intersection angle, and wherein the outer edge of the flank at the maximum shaft intersection angle is located closer to said first edge than to said second edge at the maximum shaft intersection angle, and
the boot mounting part is connected to the first edge by a tapered portion of the shaft body.

4. The drive shaft according to claim 3, wherein
the second edge is positioned closer to the splined end than a position corresponding to an inner edge of the flank at the maximum shaft intersection angle or a position in a vicinity thereof; and
the splined end of the extension is connected to the second edge by a tapered portion on the splined end.

* * * * *